(12) United States Patent
Lee

(10) Patent No.: US 6,934,289 B2
(45) Date of Patent: Aug. 23, 2005

(54) CELL PROCESSING METHOD AND APPARATUS IN AN ASYNCHRONOUS TRANSFER MODE SWITCH

(75) Inventor: Jong Ick Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 833 days.

(21) Appl. No.: 09/897,973

(22) Filed: Jul. 5, 2001

(65) Prior Publication Data

US 2004/0202163 A1 Oct. 14, 2004

(30) Foreign Application Priority Data

Jul. 7, 2000 (KR) .......................................... 2000-38781

(51) Int. Cl.[7] .......................... H04L 12/28; H04L 12/56
(52) U.S. Cl. ........................ 370/395; 370/390; 370/412
(58) Field of Search ................................. 370/299, 263, 370/270, 266, 267, 351–360, 363, 369, 378, 379, 382, 376, 386–390, 395.1, 396, 395.4, 398, 395.7, 395.71, 395.72, 400, 395, 238.1, 412, 413, 414, 417, 422, 428, 429, 229, 432, 395.42, 216–221, 244, 250, 225–228, 242, 237, 236.1, 236, 278

(56) References Cited

U.S. PATENT DOCUMENTS

| | | | | |
|---|---|---|---|---|
| 5,572,522 A | * | 11/1996 | Calamvokis et al. | 370/390 |
| 5,592,476 A | * | 1/1997 | Calamvokis et al. | 370/390 |
| 5,898,687 A | * | 4/1999 | Harriman et al. | 370/390 |
| 5,991,295 A | * | 11/1999 | Tout et al. | 370/395.7 |
| 6,307,860 B1 | * | 10/2001 | Joffe et al. | 370/412 |
| 6,320,861 B1 | * | 11/2001 | Adam et al. | 370/395.7 |
| 6,320,864 B1 | * | 11/2001 | Hebb et al. | 370/412 |
| 6,493,347 B2 | * | 12/2002 | Sindhu et al. | 370/401 |

* cited by examiner

Primary Examiner—Wellington Chin
Assistant Examiner—Jamal A. Fox
(74) Attorney, Agent, or Firm—Fleshner & Kim, LLP

(57) ABSTRACT

A cell processing method and apparatus in an ATM switch can reduce or prevent cell loss and throughput deterioration of the switch caused by HOL blocking. The cell processing method can include storing unicast cells and multicast cells in a shared buffer memory and storing addresses of the respective cells in different address queues, assigning respective priorities to the cells stored in the shared buffer memory, reading out the cells from the shared buffer memory according to the assigned priorities, and sending the cells read out from the shared buffer memory to fan-out ports and determining the cell to be output when multiple cells reach a fan-out port. The processing apparatus can include a buffer that stores cells inputted to the ATM switch, multicast connection identifier (MCI) address queues that store buffer addresses of multicast cells and unicast address queues for storing buffer addresses of unicast cells.

28 Claims, 9 Drawing Sheets

FIG.3
BACKGROUND ART
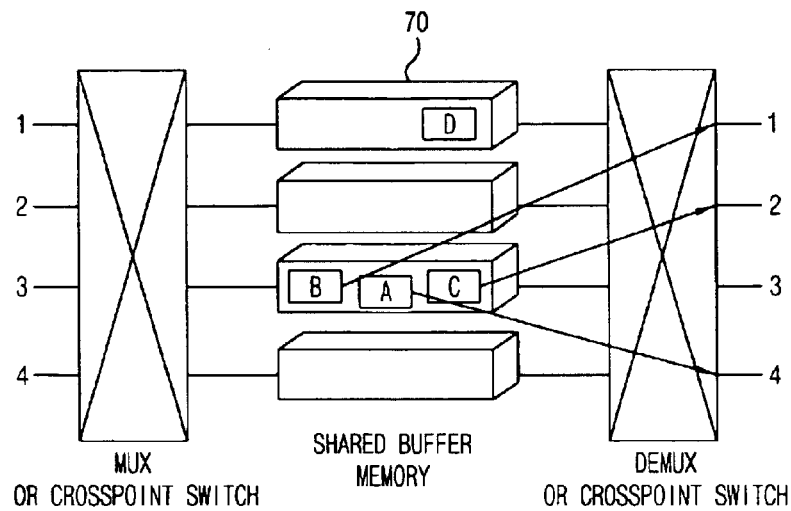
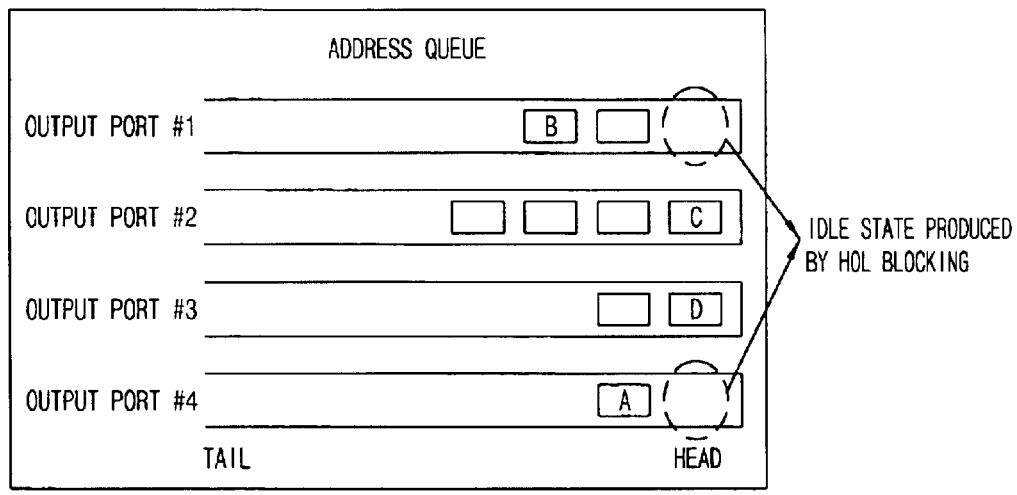

FIG.7A

|  | OUTPUT #1 | OUTPUT #2 | OUTPUT #3 | OUTPUT #4 |
|---|---|---|---|---|
| MCI #1 ADDRESS QUEUE | 89 | 88 | (90) | (84) |
| MCI #2 ADDRESS QUEUE | (91) | (95) | 80 | 83 |
| MAXIMUM QUEUE LENGTH | 91 | 95 | 90 | 84 |
| PRIORITY | 2 | 1 | 3 | 4 |

FIG. 7B

OUTPUT PORT & READ PRIORITY OF UNICAST CELL(s)

| READ PRIORITY \ OUTPUT PORT | 1 | 2 | 3 | 4 |
|---|---|---|---|---|
| 1st | | | SBM #4($s_1$) | |
| 2nd | SBM #2($s_2$) | | | |
| 3rd | | SBM #2($s_3$) | | |
| 4th | | | | SBM #2($s_4$) |

FIG. 7C

OUTPUT PORT & READ PRIORITY OF MULTICAST CELL(m)

| READ PRIORITY \ OUTPUT PORT | 1 | 2 | 3 | 4 |
|---|---|---|---|---|
| 1st | | SBM #2($m_1$) | | |
| 2nd | SBM #3($m_2$) | | | |
| 3rd | | | SBM #4($m_3$) | |
| 4th | | | | SBM #4($m_4$) |

QUEUE LENGTH OF m1 : 95
QUEUE LENGTH OF m2 : 91
QUEUE LENGTH OF m3 : 90
QUEUE LENGTH OF m4 : 84

CELL PROCESSING METHOD AND APPARATUS IN AN ASYNCHRONOUS TRANSFER MODE SWITCH

BACKGROUND OF THE INVENTION

1. Field of the Invention

The present invention relates to a cell process in an asynchronous transfer mode (ATM) switch.

2. Background of the Related Art

Multicast is a bidirectional communication among multiple sites, and refers to the type of communication that is performed between one transmission part and multiple destination parts. For instance, transmitting an e-mail to all addresses stored in an address book is multicasting. Multicasting is also the type of communication used for a teleconference such as a video-conference or audio-conference where one transmission part transmits a video or audio signal to multiple selected destination parts, i.e., sites, or for the transmission of video data from a video-on-demand (VOD) server to multiple subscriber set top boxes.

Unicast is in contrast to the multicast, and means the communication type that is performed between one transmission part and one destination part.

As related art multicasting systems are used in ATM switching, there exist a cell-copy type multicasting system and an address-copy type multicasting system.

FIG. 1 is a block diagram illustrating the construction of a related art cell-copy type multicasting system. According to this system, a cell-copy circuit 10 is provided in front of a switch fabric, and a multicast cell having various destination addresses is copied to various unicast cells having one destination address. In the cell-copy type multicasting, the input multicast cell at an input terminal is copied to a plurality of unicast cells corresponding to respective output ports, i.e., fan-out ports, and the copied unicast cells are stored in a plurality of cell memory spaces in a shared buffer 30. The buffer number and addresses are stored in an address queue 20.

In the above-described cell-copy type multicasting structure, the number of cells stored in the shared buffer 30 is increased in proportion to the number of destinations of the multicast cells or the number of fan-out ports. This causes the cell traffic to be increased in the ATM switch and leads to excessive cell loss in the multicast environment.

FIG. 2 is a block diagram illustrating the construction of a related art address-copy type multicasting system. According to this address-copy type system, a multicast cell is stored in a shared buffer 60, and the address of the shared buffer 60 that stores the multicast cell is copied by an address copy circuit 40 and then stored in an address queue 50 corresponding to respective fan-out ports.

In the above-described address-copy type multicasting structure, the multicast cell is stored in a cell memory space in the shared buffer 60, and the buffer number and the addresses of the buffer are copied by the address copy circuit 40 and then stored in the address queue 50. In this case, the effective traffic is not increased in the shared buffer 60, but the traffic of the address queue 50 that stores the addresses of the multicast cells is increased, causing the head-of-line (HOL) blocking phenomenon also to be increased. This blocking phenomenon in the multicast environment results in the deterioration of throughput of the ATM switch.

FIG. 3 illustrates HOL blocking in a related art shared buffer memory type ATM switch. It is assumed that cells A, B, C, and D positioned on the heads of respective address queues should be outputted to a cell time slot. Since the cells B, A, and C are stored in the third buffer of a shared buffer memory 70 together, they cannot be simultaneously read out by the cell time slot. That is, the shared buffer memory 70 can perform the read or write operation for only one cell of cells B, A and C at a time.

Accordingly, only one cell among the cells B, A, and C is read out by the third buffer, and the remaining two fan-out ports are in an idle state, which deteriorates the throughput of the whole switching system. According to the queuing theory, it is known that the throughput deteriorates by about 46%.

The above references are incorporated by reference herein where appropriate for appropriate teachings of additional or alternative details, features and/or technical background.

SUMMARY OF THE INVENTION

An object of the invention is to solve at least the above problems and/or disadvantages in a whole or in part and to provide at least the advantages described hereinafter.

Another object of the present invention is to provide a cell processing method and apparatus in an ATM switch that provides a local switch controlled multicast connection identifier (MCI) to each multicast cell.

Another object of the present invention is to provide a cell processing method and apparatus in an ATM switch that can prevent cell loss in the multicast environment.

Another object of the present invention is to provide a cell processing method and apparatus in an ATM switch that can reduce head-of-line (HOL) blocking.

Another object of the present invention is to provide a cell processing method and apparatus in an ATM switch using an multicast connection identifier (MCI).

Another object of the present invention is to provide a cell processing method and apparatus in an ATM switch that can increase throughput in the multicast environment.

Another object of the present invention is to provide a cell processing method and apparatus in an ATM switch that can reduce cell loss and reduce the HOL blocking in the multicast environment that is produced between unicast cells and multicast cells by giving a multicast connection identifier (MCI) to the respective multicast cell.

To achieve the above-described objects in accordance with the purpose of the present invention, there is provided a cell processing method in an ATM switch that includes storing unicast cells and multicast cells in a shared buffer memory, and storing addresses of the respective cells in address queues, giving respective priorities to the cells stored in the buffer, reading out the cells from the buffer according to the given priorities, and sending the cells read out from the buffer to fan-out ports, and determining the cell to be finally outputted.

To further achieve the above-described objects in accordance with the purpose of the present invention, there is provided a cell processing method in an asynchronous transfer mode (ATM) switch that includes storing unicast cells and multicast cells in a buffer, and storing addresses of the respective cells in address queues, calculating queue lengths for respective fan-out ports of the address queues, determining priorities of the cells by comparing the calculated queue lengths, confirming storage locations of the cells having the determined priorities in the buffer, reading out the cells from the buffer according to the determined priorities, and sending the cells read out from the buffer to the fan-out ports and determining a cell of the sent cells to a fan-out port for output.

To further achieve the above-described objects in accordance with the purpose of the present invention, there is provided a cell processing apparatus in an ATM switch including a buffer that stores cells inputted to the ATM switch, multicast connection identifier (MCI) address queues that store buffer addresses of multicast cells, unicast address queues that store buffer addresses of unicast cells, and fan-out ports that receive the cells from the respective address queues and output the received cells to corresponding destinations.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a view illustrating HOL blocking a related art shared buffer memory type ATM switch;

FIG. 7A is a table showing queue length and priority for each fan-out port of the MCI address queue;

FIG. 7B is a diagram illustrating a read priority of a unicast cell and fan-out port;

FIG. 7C is a diagram illustrating a read priority of a multicast cell and fan-out port.

DETAILED DESCRIPTION OF PREFERRED EMBODIMENTS

Figure 1:
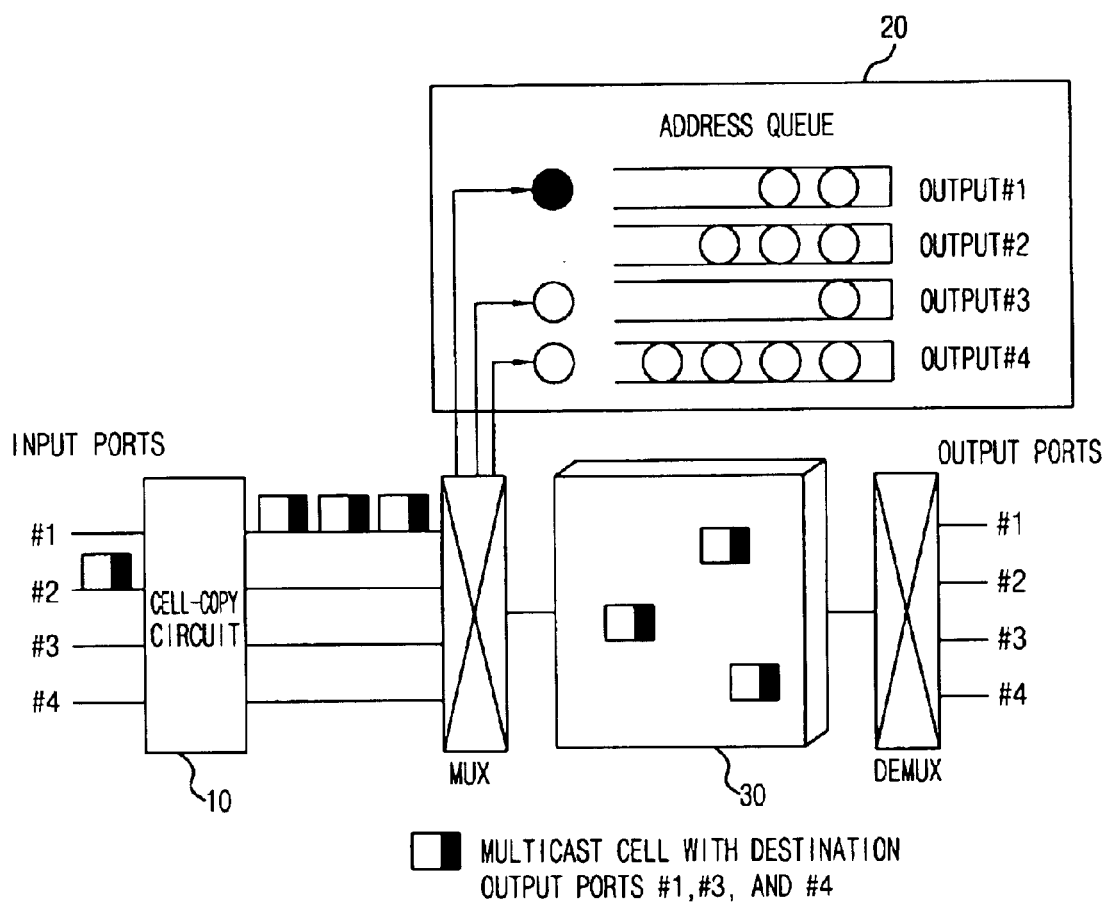
FIG. 1 is a block diagram illustrating the construction of a related art cell-copy type multicasting system.
Figure 2:
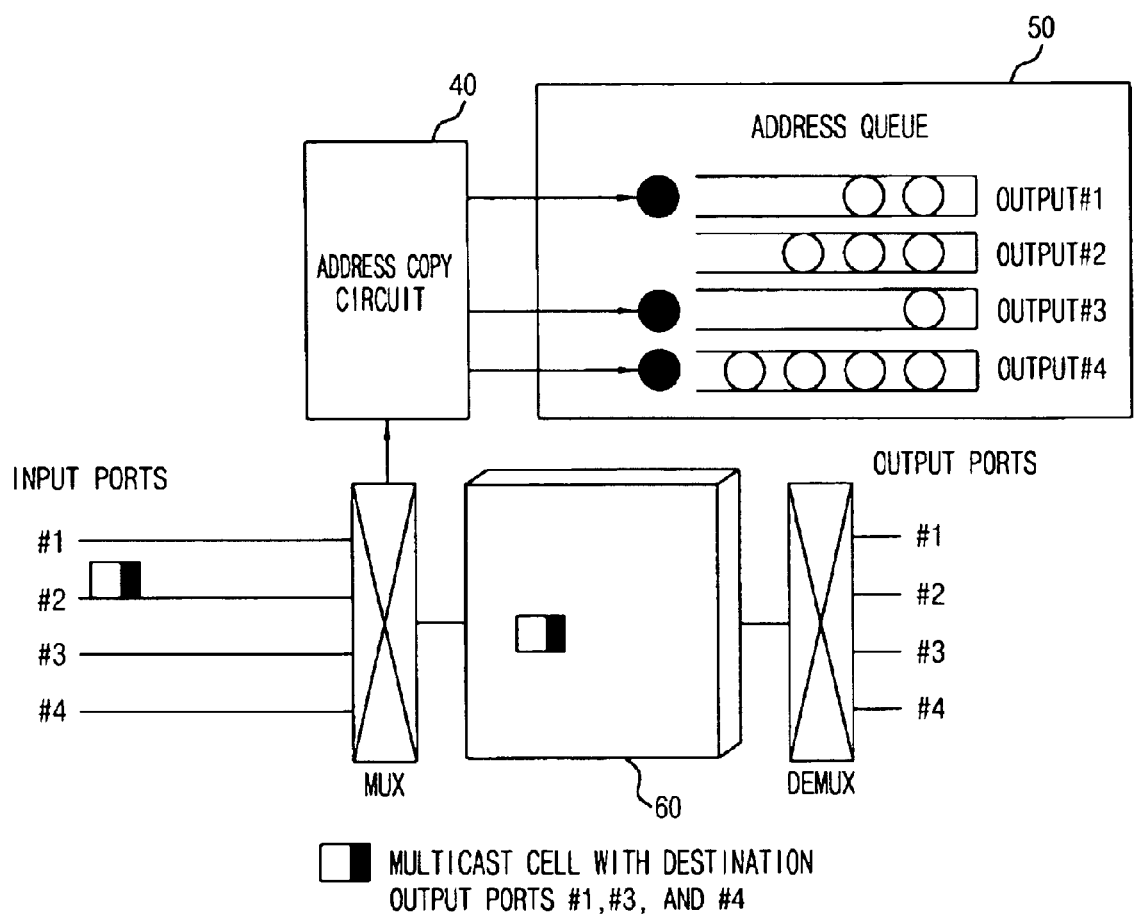
FIG. 2 is a block diagram illustrating the construction of a related art address-copy type multicasting system.
Figure 4:
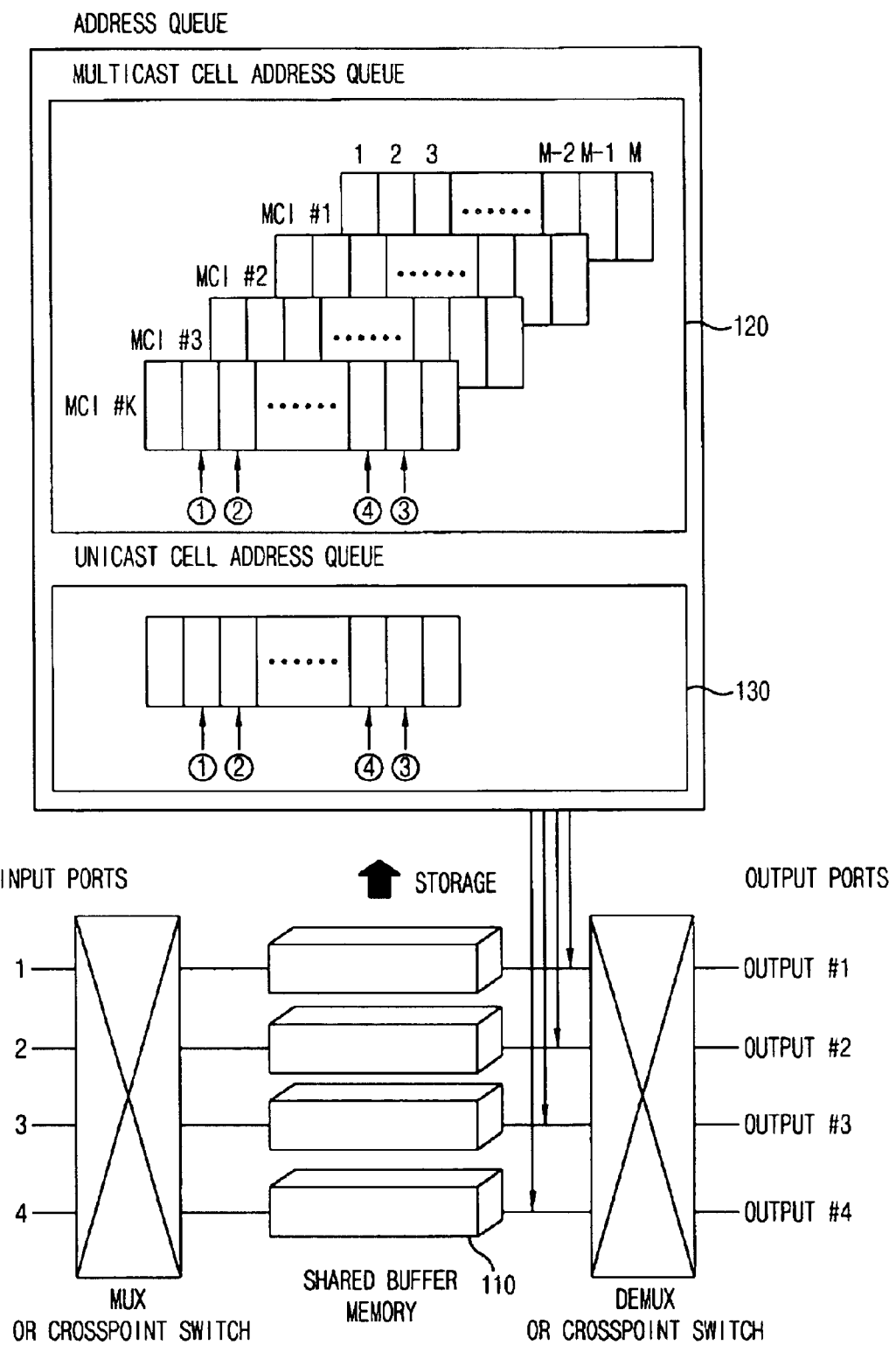
FIG. 4 is a block diagram illustrating a preferred embodiment of a cell processing apparatus in an ATM switch according to the present invention.
Figure 5:
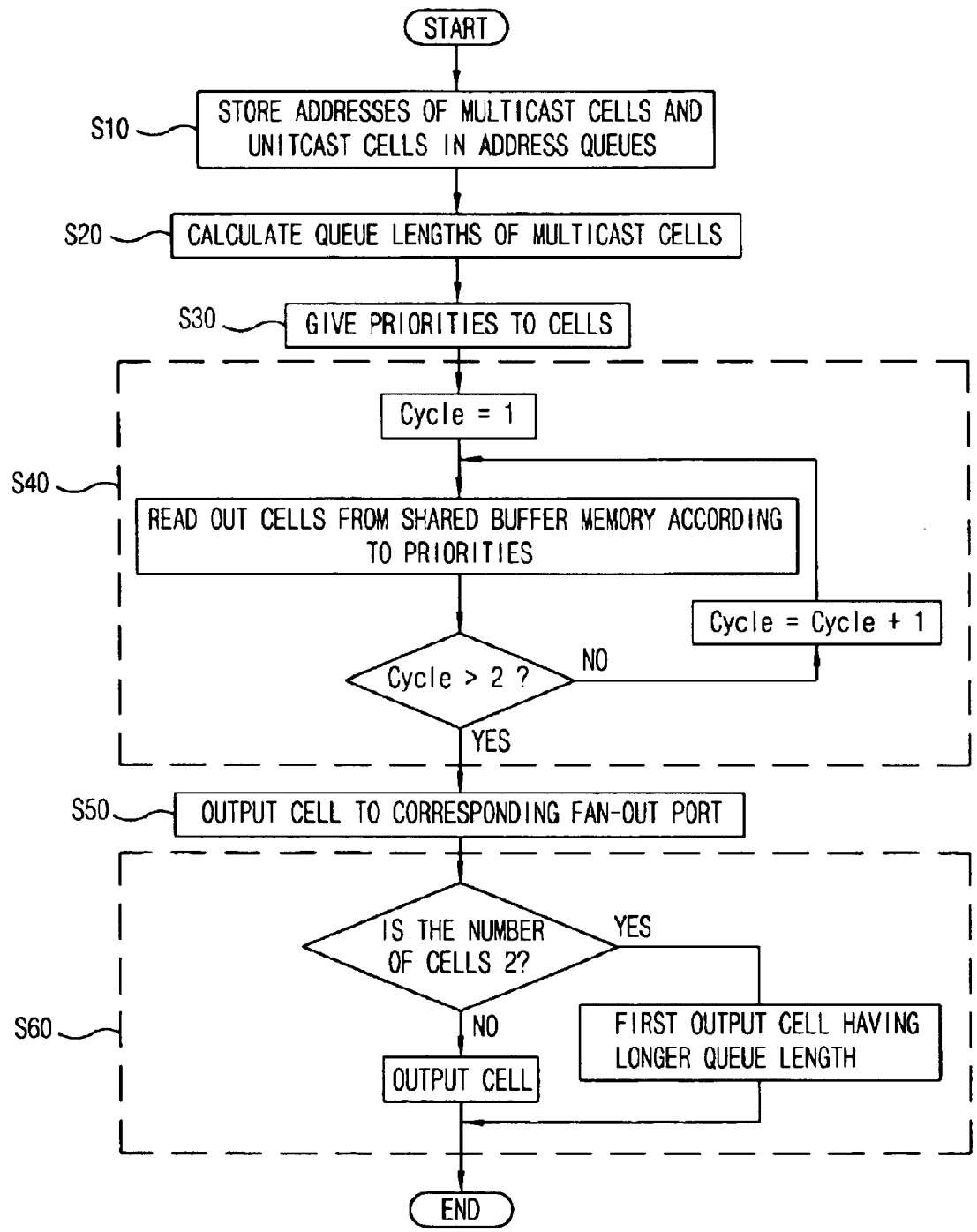
FIG. 5 is a flowchart illustrating a preferred embodiment of a cell processing method according to the present invention.

FIG. 4 is a block diagram illustrating a preferred embodiment of a cell processing apparatus in an ATM switch according to the present invention, and FIG. 5 is a flowchart illustrating a preferred embodiment of a cell processing method according to the present invention. The preferred embodiment of a cell processing method of FIG. 5 can be used, for example, in the cell processing apparatus of FIG. 5.

As shown in FIGS. 4 and 5, addresses of the respective cells may be stored in address queues 120 and 130 (step S10). According to the related art cell copying system or address copying system, addresses of the multicast cells and unicast cells are stored in one address queue. By contrast, according to preferred embodiments of the present invention, the ATM switch may classify the multicast cells and unicast cells in a shared buffer memory 110, store addresses of the multicast cells in a multicast connection identifier (MCI) address queue 120, store addresses of the unicast cells in a unicast queue 130, and separately maintain the address queues of the multicast cells and the unicast cells. As used herein, the address of the multicast cell or the unicast cell preferably means the buffer number or address of the shared buffer memory 110.

The MCI is a kind of identifier given to all the multicast cells transmitted through a call determination, and may be a locally unique value in the corresponding switch. The multicast cells having the same MCI are stored in the address of the corresponding MCI address queue 120. The MCI address queue 120 preferably has the same number of read pointers as fan-out ports, and one write pointer.

The read pointers are assigned to the respective fan-out ports of the ATM switch, and increased one by one whenever the multicast cell is read out. The write pointer represents the position of the MCI address queue 120 where the addresses of the multicast cells are stored, and increased one by one whenever the multicast cell that belongs to the corresponding MCI is inputted to the MCI address queue 120.

According to the process of selecting multicast cells to be read out to the respective fan-out ports of the ATM switch, queue lengths of the respective fan-out ports of the MCI address queue 120 may be obtained (step S20), and read priorities may be determined with respect to the multicast cells having the longest queue length for the respective fan-out port by comparing the lengths of the respective obtained fan-out ports (step S30). Then, the ATM switch confirms in which buffer of the shared buffer memory 110 the cell having the determined priority is positioned. The queue length is preferably the difference value between the write pointer address of the MCI address queue 120 and the read pointer address of the respective fan-out port. Thus, the queue length preferably identifies the number of cells waiting for their output.

The cells stored in the shared buffer memory 110 are given respective priorities. The priority of the unicast cell may be determined by the length of the unicast address (step S30).

Once the priority of the respective cell is determined, the ATM switch may start to read out the cell from the shared buffer memory 110 (step S40). During the read cycle of the shared buffer, the ATM switch may check whether HOL blocking is produced among the cells, and may read out the cells from the shared buffer memory.

If HOL blocking is produced between the unicast cells, the unicast cell having a higher priority may be read first from buffer 110. Likewise, if HOL blocking is produced between the multicast cells, the multicast cell having a higher priority is read out first from the shared memory buffer 110. Where HOL blocking is produced between the unicast cell and the multicast cell, the unicast cell is preferably read out first, irrespective of the queue length of the cell.

The reading of the cell from the shared buffer memory of the ATM switch may be repeated three times for each cell time slot, and the cells read out from the shared buffer memory 110 may be sent to the corresponding fan-out ports (step S50). For one reading cycle of the shared buffer i.e., ⅓ cell time slot), the cells which can reach the respective fan-out ports may be classified into three cases: (1) only the unicast cell reaches the fan-out port, (2) only the multicast cell reaches the fan-out port, and (3) both the unicast cell and the multicast cell reach the fan-out port simultaneously. The maximum number of cells that can reach the port is 2, which corresponds to the case where both the unicast cell and the multicast cell reach the port. The fan-out mask may then output the cell having the longest queue length (step S60).

Figure 6:
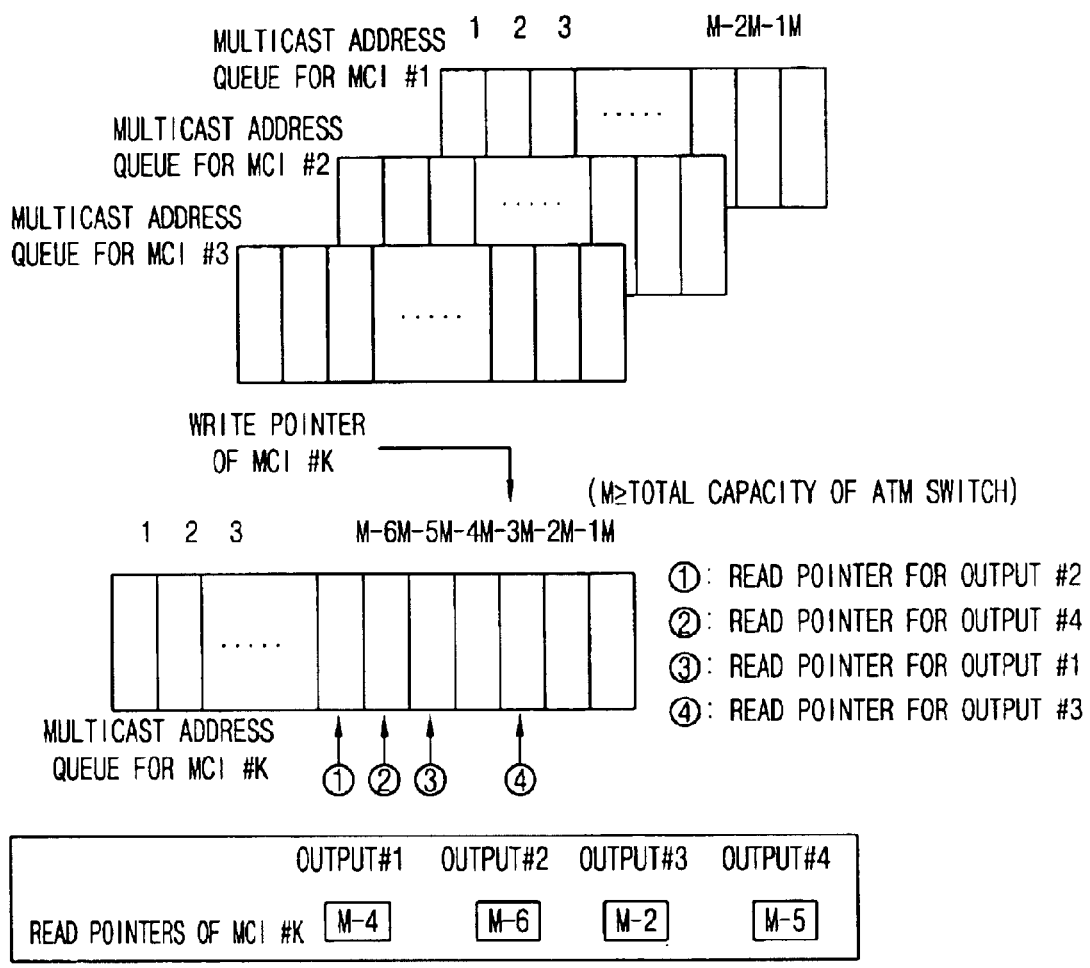
FIG. 6 is a diagram illustrating MCI address queues and pointers for each MCI according to the present invention.

FIG. 6 is a diagram illustrating MCI address queues and pointers maintained for each MCI. The respective multicast cell in the ATM switch is discriminated from a unicast cell by the MCI given thereto, and from multicast cells for a different call determination as well. The MCI is given to the multicast cells by the ATM switch itself, and all multicast cells transmitted through one call determination have the same MCI. Accordingly, the assignment of MCI value and the determination of the MCI address queue 120 can be changed by the ATM switch.

MCI address queue 120 may have M address storage spaces, where M is greater than or equal to the total capacity of the ATM switch. MCI address queue 120 may store the addresses of the shared buffer memory 110 of the multicast cell, including a number that represents the order of a buffer and the address of the corresponding buffer.

The MCI address queue 120 has read pointers preferably equal in number to the fan-out ports, and one write pointer. The read pointer indicates the address of the MCI address queue 120 that stores the cell for each fan-out port of the ATM switch, and the write pointer indicates the vacant address of the MCI address queue in which the address of the multicast cell is to be written. For example, it is assumed that the address of the multicast cell stored in #12 address of the third buffer is stored in the $36^{th}$ address of the MCI #2 address queue. If the $36^{th}$ address of the MCI address queue 120 is accessed by the read pointer of #2 fan-out port and the read pointer of #3 fan-out port, the multicast cell stored in #12 address of the third buffer should be outputted through both the #2 and #3 fan-out ports.

As shown in FIG. 6, M-6, M-5, M-4, and M-2 of the MCI #K address queue are referred to by the read pointer indicating #2 fan-out port, the read pointer indicating #4 fan-out port, the read pointer indicating #1 fan-out pointer and the read pointer indicating #3 fan-out pointer, respectively. Accordingly, in the MCI #K address queue, the cell referred to by M-6 is read out to #2 fan-out port, the cell referred to by M-5 is read out to #4 fan-out port, the cell referred to by M-4 is read out to #1 fan-out port, and the cell referred to by M-2 is read out to #3 fan-out port, respectively.

The multicast cells stored in the MCI address queue 120 are preferably outputted using a call-splitting method. The call-splitting method does not send all multicast cells to the corresponding fan-out ports for one cell time, but outputs the multicast cells for several cell times. For example, if it is assumed that destination fan-out ports of the cells in the MCI #2 address queue are #1, #2, and #4, a non call-splitting method outputs all the corresponding cells in the MCI #2 address queue to the #1, #2, and #4 fan-out ports when the cells are read out from the shared buffer memory 110. In contrast, according to the call-splitting method, when the corresponding cells in the MCI address queue are read out from the shared buffer memory 110, a portion of the cells are outputted to prescribed fan-out ports (for example, #1 and #4 fan-out ports) for one cell time, and the remaining cells are outputted to the remaining fan-out port (i.e., #2 fan-out port) for the next cell time.

FIG. 7A is a diagram illustrating a table showing a queue length and priority for each fan-out port of the MCI address queue. To select the multicast cell having the longest queue length for each fan-out port, the read pointer and the write pointer of the respective MCI address queue 120 calculate the difference between the write pointer of the MCI address queue 120 and the read pointer of the respective fan-out port. The lengths of the respective MCI address queues 120 for each fan-out port are then compared. The read priority is determined in the order of the queue length for each fan-out port. Then, the buffer number of the shared buffer memory 110 holding the respective cell having the determined read priority is confirmed.

Next, the queue lengths of the fan-out ports (e.g., 4) of the n-th MCI address queue are preferably obtained according to equations (1)–(4) as follows:

* n-th MCI address queue

Queue length of #1 fan-out port=*write pointer−read pointer of #1 fan-out port* (1)

Queue length of #2 fan-out port=*write pointer−read pointer of #2 fan-out port* (2)

Queue length of #3 fan-out port=*write pointer−read pointer of #3 fan-out port* (3)

Queue length of #4 fan-out port=*write pointer−read pointer of #4 fan-out port* (4)

As shown in FIG. 7A, the vertical axis and horizontal axis indicate the MCI address queues 120 and the fan-out ports, respectively. The calculated values of queue length for the corresponding fan-out ports of the MCI address queues 120 and the corresponding priorities are also shown in FIG. 7A.

The relationship between the MCI address queues #1 and #2 and the fan-out ports will now be described. The contents stored in the addresses of the respective MCI address queues are the multicast cell addresses on the shared buffer memory 110.

For instance, assume the multicast cell address stored in $11^{th}$ address of the MCI #1 address queue is sent to #1 fan-out port, and the cell addresses stored in $12^{th}$, $10^{th}$, and $16^{th}$ addresses are sent to #2, #3, and #4 fan-out ports. Also, in case of the MCI #2 address queue, the multicast cell addresses on the shared buffer memory stored in $9^{th}$, $5^{th}$, $20^{th}$, and $17^{th}$ addresses are sent to #1, #2, #3, #4 fan-out ports.

Next, the process of selecting the fan-out port having the longest queue length among the MCI #1 and #2 address queues will be described. It is assumed in FIG. 7A that the write pointers of the MCI #1 and #2 address queues refer to the $100^{th}$ address. As described above, the length of queue corresponds to the number of cells stored in the corresponding address queue.

In the MCI #1 address queue, the length of the address queue to be read out to the #1 fan-out port is 89 (i.e., 100-11), the length of the address queue to be read out to the #2 fan-out port is 88 (i.e., 100-12), the length of the address queue to be read out to the #3 fan-out port is 90 (i.e., 100-10), and the length of the address queue to be read out to the #4 fan-out port is 84 (i.e., 100-16). In the MCI #2 address queue, the length of the address queue to be read out to the #1 fan-out port is 91 (i.e., 100-9), the length of the address queue to be read out to the #2 fan-out port is 95 (i.e., 100-5), the length of the address queue to be read out to the #3 fan-out port is 80 (i.e., 100-20), and the length of the address queue to be read out to the #4 fan-out port is 83 (i.e., 100-17).

The MCI #2 address queue is 91 and is the longest address queue in the #1 fan-out port. The MCI #2 address queue is 95 and is the longest address queue in the #2 fan-out port. Also, the MCI #1 address queue is 90 and is the longest address queue in the #3 fan-out port, and the MCI #1 address queue is 84 and the longest one in the #4 fan-out port.

Thus, the read priority is determined in the order of the queue length for the respective fan-out ports. In the above example, the first priority is the MCI #2 address queue to be read out to the #2 fan-out port, the second priority is the MCI #2 address queue to be read out to the #1 fan-out port, and the third priority is the MCI #1 address queue to be read out to the #3 fan-out port. The fourth priority is the MCI #1 address queue to be read out to the #4 fan-out port.

Thereafter, it is confirmed which buffer in the shared buffer memory 110 is indicated by the read pointer for each fan-out port of the MCI address queue 120 having the given read priority. This confirmation is for reducing or preventing the HOL blocking, and the processing method is different in accordance with the type of the HOL blocking.

If the HOL blocking is produced among the unicast cells, the unicast cell having the higher read priority is first read out from the shared buffer memory 110. If the HOL blocking is produced among the multicast cells, the multicast cell having the higher read priority is first read out from the shared buffer memory 110.

When the HOL blocking is produced among the unicast cell and the multicast cell, the unicast cell is preferably read out first irrespective of the queue length of the respective cell.

Figure 8:
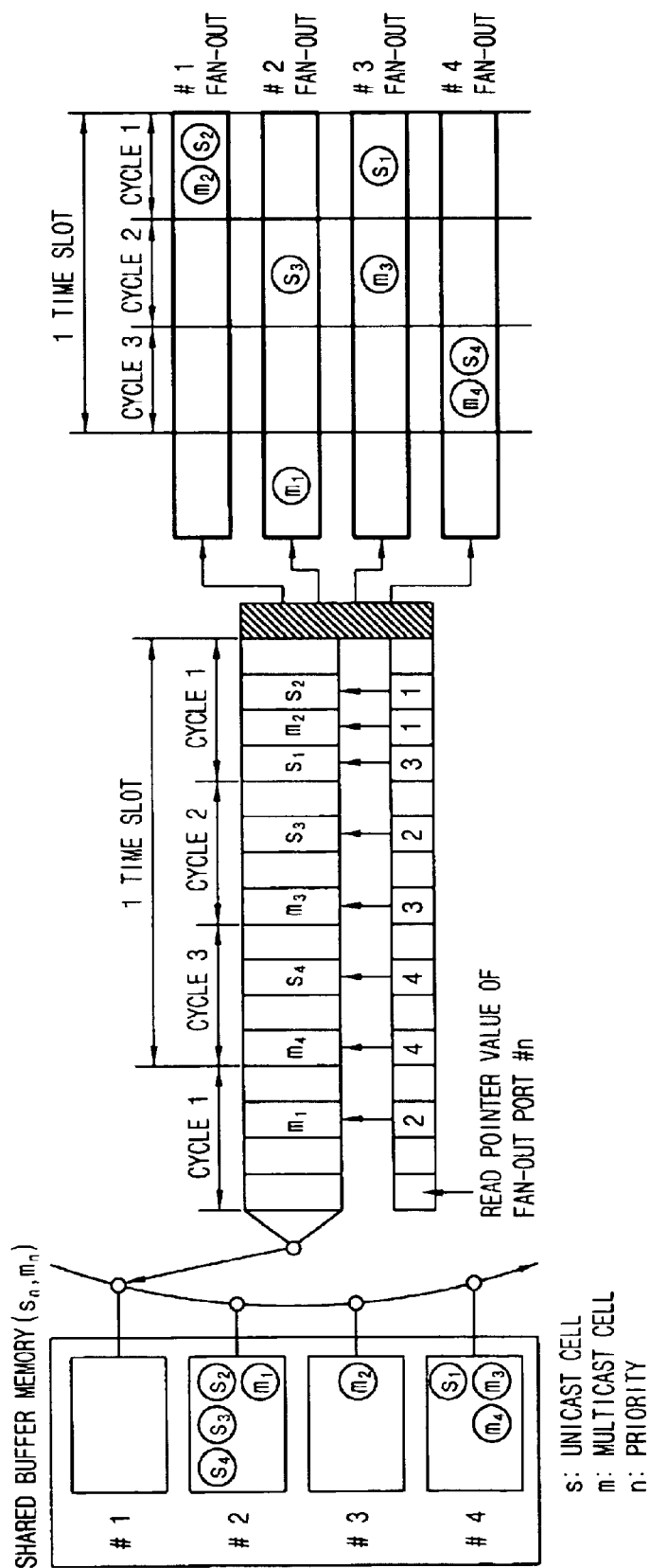
FIG. 8 is a diagram illustrating preferred embodiments of a cell process in an ATM switch according to the present invention.

FIG. 7B is a diagram that shows read priorities given to the unicast cells, and FIG. 7C is a diagram that shows read priorities given to the multicast cells. FIG. 8 is a diagram that shows a preferred embodiment of a process of reading out the cells from the shared buffer memory and sending them to the corresponding fan-out ports in the ATM switch according to the present invention.

To prevent the performance deterioration of the ATM switch caused by the HOL blocking, the ATM switch preferably performs the read operation three times for one cell time. As shown in FIG. 7B, the unicast cells are stored in the fourth buffer (e.g., SBM 4), the second buffer, the second buffer, and the second buffer, respectively, according to the read priorities. Also, as shown in FIG. 7C, the multicast cells are stored in the second buffer, the third buffer, the fourth buffer, and the fourth buffer, respectively, according to the read priorities.

During the read cycle of the first shared buffer memory, the unicast cells having the first and second read priorities are read out from the fourth and second buffers, but the multicast cell having the highest priority is not read out. This is because the unicast cell has a higher priority than the multicast cell. During the read cycle of the first shared buffer memory, the third buffer is not used for reading the unicast cell, and thus the multicast cell having the second read priority is read.

During the read cycle of the second shared buffer memory, the unicast cell having the third read priority is read out from the second buffer. This cell is the cell that was not read out due to the unicast cell having the second read priority during the previous cycle. Since the fourth buffer is not used for reading the unicast cell, the multicast cell having the third read priority stored in the fourth buffer is read out.

During the read cycle of the third shared buffer memory, the unicast cell having the fourth read priority stored in the second buffer and the multicast cell having the fourth read priority stored in the fourth buffer are read out.

It can be recognized from the read cycle of the first and third shared buffers that one unicast cell and one multicast cell are simultaneously read out to the #1 and #4 fan-out ports, respectively. The fan-out mask finally outputs the cell having a longer queue length than the other cell.

As described above, preferred embodiments of a cell processing method and apparatus according to the present invention have various advantages. In the preferred embodiments, the cell processing method and apparatus in an ATM switch can solve problems of the excessive cell loss and the throughput deterioration of the switch. Excessive cell loss and throughput deterioration are caused by the HOL blocking generated in the related art cell-copy type or address-copy type multicasting system.

Preferred embodiments of multicasting apparatus and methods according to the present invention increase or improve multicasting function of the ATM switch. Further, a performance difference between the preferred embodiments and the related art multicasting system becomes greater as the multicast traffic is increased. Thus, preferred embodiments of multicasting methods can be used in a network environment for applications that require the multicast services such as the VOD, teleconference, etc.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A cell processing method in an asynchronous transfer mode (ATM) switch comprising:

storing unicast cells and multicast cells in a plurality of shared buffers, and storing addresses of the respective cells in address queues;

giving respective priorities to the cells stored in the buffer;

reading out the cells from the buffer according to the given priorities; and sending the cells read out from the buffer to fan-out ports, and determining the cell to be finally outputted, wherein reading out the cells from the buffer according to the assigned priorities comprises:

reading out in a first cycle a highest priority unicast cell from each buffer if one exists and not reading out any multicast cells in the same corresponding buffer; and if during the first cycle, a respective buffer does not include a unicast cell, but includes a multicast cell, reading out the multicast cell during the first cycle even if a multicast cell with a higher priority exists along with a unicast cell in another buffer.

2. The cell processing method as claimed in claim 1, wherein the addresses stored in the address queues are addresses of the cells stored in the buffer.

3. The cell processing method as claimed in claim 1, wherein the multicast cell addresses are stored in the address queues in distinction from the unicast cell addresses.

4. The cell processing method as claimed in claim 1, wherein the address queues for storing the multicast cell addresses are multicast connection identifier (MCI) address queues maintained for each MCI.

5. The cell processing method as claimed in claim 4, wherein the MCI address queue has one write pointer and read pointers as many as the number of fan-out ports.

6. The cell processing method as claimed in claim 1, wherein the priorities of the unicast cells are determined in the order of their input to the address queues.

7. The cell processing method as claimed in claim 1, wherein the step of giving the priorities comprises the steps of:
- calculating queue lengths for the respective fan-out ports;
- determining the priorities by comparing the calculated queue lengths for the respective fan-out ports; and
- confirming which buffers the cells having the determined priorities are stored in.

8. The cell processing method as claimed in claim 7, wherein the queue length is a difference value between the write pointer address and the read pointer address.

9. The cell processing method as claimed in claim 1, wherein at the step of reading out the cells from the buffer, if a head of line (HOL) blocking is produced between the unicast cells, the unicast cell having a higher priority is first read out if the HOL blocking is produced between the multicast cells, the multicast cell having a higher priority is first read out; and if the HOL blocking is produced between the unicast cell and the multicast cell, the unicast cell is first read out irrespective of the queue length of the cell.

10. The cell processing method as claimed in claim 1, wherein at the step of determining the cell to be finally outputted at the fan-out port, if the unicast cell and the multicast cell simultaneously reach the fan-out port, the cell having a longer queue length is finally outputted.

11. A cell processing method in an asynchronous transfer mode (ATM) switch comprising:
- storing unicast cells and multicast cells in a buffer, and storing addresses of the respective cells in address queues;
- giving respective priorities to the cells stored in the buffer;
- reading out the cells from the buffer according to the given priorities; and sending the cells read out from the buffer to fan-out ports, and determining the cell to be finally outputted, wherein reading out the cells from the buffer is performed three times for one slot time.

12. A cell processing method in an asynchronous transfer mode (ATM) switch comprising the steps of:
- storing unicast cells and multicast cells in a buffer plurality of shared buffers, and storing addresses of the respective cells in address queues;
- calculating queue lengths for respective fan-out ports of the address queues;
- determining priorities of the cells by comparing the calculated queue lengths;
- confirming which buffers the cells having the determined priorities are stored in;
- reading out the cells from the buffer according to the given priorities; and
- sending the cells read out from the buffer to the fan-out ports, and determining the cell to be finally outputted, wherein reading out the cells from the buffer according to the given priorities comprises:
- reading out in a first cycle a highest priority unicast cell from each buffer if one exists and not reading out any multicast cells in the same corresponding buffer; and
- if during the first cycle, a respective buffer does not include a unicast cell, but includes a multicast cell, reading out the multicast cell during the first cycle even if a multicast cell with a higher priority exists along with a unicast cell in another buffer.

13. The cell processing method as claimed in claim 12, wherein the addresses stored in the address queues are addresses of the cells stored in the buffer.

14. The cell processing method as claimed in claim 12, wherein the multicast cell addresses are stored in the address queues in distinction from the unicast cell addresses.

15. The cell processing method as claimed in claim 12, wherein the address queues for storing the multicast cell addresses are multicast connection identifier (MCI) address queues maintained for each MCI.

16. The cell processing method as claimed in claim 15, wherein the MCI address queue has one write pointer and read pointers as many as the number of fan-out ports.

17. The cell processing method as claimed in claim 12, wherein the priorities of the unicast cells are determined in the order of their input to the address queues.

18. The cell processing method as claimed in claim 12, wherein the queue length is a difference value between a write pointer address and a read pointer address.

19. The cell processing method as claimed in claim 12, wherein at the step of reading out the cells from the buffer, if a head of line (HOL) blocking is produced between the unicast cells, the unicast cell having a higher priority is first read out; if the HOL blocking is produced between the multicast cells, the multicast cell having a higher priority is first read out; and if the HOL blocking is produced between the unicast cell and the multicast cell, the unicast cell is first read out irrespective of the queue length of the cell.

20. The cell processing method as claimed in claim 12, wherein cases that the cells reach a certain fan-out port are a case that only the unicast cell reaches, a case that only the multicast cell reaches, and a case that both the unicast cell and the multicast cell reach simultaneously, and if both the unicast cell and the multicast cell reach simultaneously, the cell having a longer queue length than the other cell is finally outputted.

21. A cell processing apparatus in an asynchronous trasfer mode (ATM) switch comprising:
- a plurality of shared buffers for storing cells inputted to the ATM switch;
- multicast connection identifier (MCI) address queues for storing buffer addresses of multicast cells;
- unicast address queues for storing buffer addresses of unicast cells;
- fan-out ports for receiving the cells from the respective address queues, and outputting the received cells to corresponding destinations; and
- a reading unit for reading out in a first cycle a highest priority unicast cell from each buffer if one exists and not reading out any multicast cells in the same corresponding buffer, and if during the first cycle, a respective buffer does not include a unicast cell, but includes a multicast cell, reading out the multicast cell during the first cycle even if a multicast cell with a higher priority exists along with a unicast cell in another buffer.

22. The cell processing apparatus as claimed in claim 21, wherein the MCI address queue has one write pointer and read pointers as many as the number of the fan-out ports.

23. The cell processing method as claimed in claim 21, wherein the ATM switch first reads out the unicast cell having a higher priority if a head of line (HOL) blocking is produced between the unicast cells; first reads out the multicast cell having a higher priority if the HOL blocking is produced between the multicast cells; and first reads out the unicast cell irrespective of the queue length of the cell if the HOL blocking is produced between the unicast cell and the multicast cell.

24. A cell processing apparatus in an asynchronous trasfer mode (ATM) switch comprising:

a buffer for storing cells inputted to the ATM switch;

multicast connection identifier (MCI) address queues for storing buffer addresses of multicast cells;

unicast address queues for storing buffer addresses of unicast cells; and fan-out ports for receiving the cells from the respective address queues, and outputting the received cells to corresponding destinations, wherein the ATM switch reads the shared buffer memory three times for one cell time slot.

25. The cell processing method as claimed in claim 21, wherein the ATM switch determines the cell to be outputted according to the queue length if the multicast cell and the unicast cell simultaneously reach the fan-out port.

26. The cell processing method as claimed in claim 1, wherein reading out in the first cycle is performed for subsequent cycles until all unicast and multicast cells have been read out from the shared buffers.

27. The cell processing method as claimed in claim 12, wherein reading out in the first cycle is performed for subsequent cycles until all unicast and multicast cells have been read out from the shared buffers.

28. The cell processing apparatus as claimed in claim 21, wherein reading out in the first cycle by the reading out unit is performed for subsequent cycles until all unicast and multicast cells have been read out from the shared buffers.

* * * * *